US010445956B2

(12) United States Patent
Kamkar et al.

(10) Patent No.: US 10,445,956 B2
(45) Date of Patent: Oct. 15, 2019

(54) ACCESS CONTROL READER FOR SECURE HANDSFREE ACCESS WITH MOBILE DEVICES

(71) Applicant: OpenPath Security Inc., Marina Del Rey, CA (US)

(72) Inventors: Samy Kamkar, Los Angeles, CA (US); Jacqueline Mak, Los Angeles, CA (US); Cameron Kaye, Van Nuys, CA (US); Michael Biggs, Los Angeles, CA (US)

(73) Assignee: OPENPATH SECURITY INC., Marina Del Rey, CA (US)

( * ) Notice: Subject to any disclaimer, the term of this patent is extended or adjusted under 35 U.S.C. 154(b) by 0 days.

(21) Appl. No.: 16/105,658

(22) Filed: Aug. 20, 2018

(65) Prior Publication Data
US 2019/0073846 A1 Mar. 7, 2019

Related U.S. Application Data

(63) Continuation-in-part of application No. 15/695,085, filed on Sep. 5, 2017.

(51) Int. Cl.
*G07C 9/00* (2006.01)
*G06K 9/00* (2006.01)

(52) U.S. Cl.
CPC ...... *G07C 9/00119* (2013.01); *G06K 9/00335* (2013.01); *G07C 9/00111* (2013.01); *G07C 9/00309* (2013.01); *G07C 2009/00357* (2013.01); *G07C 2009/00412* (2013.01); *G07C 2209/63* (2013.01)

(58) Field of Classification Search
CPC ....................................................... G06F 21/35
USPC ................................................................ 726/9
See application file for complete search history.

(56) References Cited

U.S. PATENT DOCUMENTS

| 4,804,945 | A | 2/1989 | Millet |
| 9,767,630 | B1 | 9/2017 | Kazerani et al. |
| 10,037,525 | B2 * | 7/2018 | Neafsey ............. G06Q 20/3674 |
| 2002/0014954 | A1 | 2/2002 | Fitzgibbon et al. |
| 2004/0036573 | A1 | 2/2004 | Fitzgibbon et al. |
| 2005/0266803 | A1 * | 12/2005 | Dinur ................... H04B 1/1027 455/67.11 |
| 2007/0288995 | A1 * | 12/2007 | Terada ................. H04L 63/107 726/2 |
| 2008/0017705 | A1 | 1/2008 | Costello et al. |

(Continued)

*Primary Examiner* — Peter C Shaw
(74) *Attorney, Agent, or Firm* — Ansari Katiraei LLP; Arman Katiraei; Sadiq Ansari

(57) ABSTRACT

Secure handsfree two-stage access control is provided via a first stage that is performed when a mobile device is within a first distance from an access control reader, and a second stage that is performed when the mobile device is within a second distance from the reader, wherein the second distance is less than the first distance. Performing the first stage includes establishing a secure connection between the mobile device and the reader, and authorizing access for the mobile device to a secured resource. Performing the second stage includes providing access to the secured resource when the mobile device has been authorized to access the secured resource during the first stage, and the mobile device enters within the second distance from the reader. The second stage may be triggered in response to the reader detecting a user gesture or action.

14 Claims, 8 Drawing Sheets

(56) References Cited

U.S. PATENT DOCUMENTS

| | | |
|---|---|---|
| 2012/0280790 A1 | 11/2012 | Gerhardt et al. |
| 2014/0077929 A1 | 3/2014 | Dumas et al. |
| 2014/0125453 A1 | 5/2014 | McIntyre et al. |
| 2014/0188348 A1 | 7/2014 | Gautama et al. |
| 2014/0253385 A1* | 9/2014 | Amizur .................... G01S 5/14 342/387 |
| 2014/0340196 A1 | 11/2014 | Myers et al. |
| 2015/0055564 A1* | 2/2015 | Alam .................... H04W 52/22 370/329 |
| 2015/0371026 A1* | 12/2015 | Gnanasekaran ........ G06F 21/35 726/7 |
| 2015/0379650 A1* | 12/2015 | Theobald ................ G06Q 50/12 705/15 |
| 2016/0321517 A1* | 11/2016 | Gandolph ................ G06K 9/46 |
| 2016/0343185 A1* | 11/2016 | Dumas ................ G07C 9/00309 |
| 2017/0140593 A1* | 5/2017 | Pluss ................ G07C 9/00309 |
| 2019/0073468 A1 | 3/2019 | Kazerani et al. |

* cited by examiner

ACCESS CONTROL READER FOR SECURE HANDSFREE ACCESS WITH MOBILE DEVICES

CLAIM OF BENEFIT TO RELATED APPLICATIONS

This application is a continuation-in-part of U.S. nonprovisional application Ser. No. 15/695,085 entitled "Decoupled Authorization for Restricted Resource Access", filed Sep. 5, 2017. The contents of application Ser. No. 15/695,085 are hereby incorporated by reference.

BACKGROUND ART

User Equipment ("UE") for voice and/or data access from wireless network service providers may be adapted for access control uses including, for example, opening secured entry points, opening or starting devices, and/or other secured access to a restricted resource. Leveraging UEs for these access control uses is desirable because of the multitude of other functions that are used and/or accessed from the UEs, and also because UEs are almost ubiquitously carried by every individual. Thus, users can have one less object (e.g., a physical key, a proximity card, a smart card, etc.) on their person when accessing an entry point or other secure resource via their respective UEs.

Despite the convenience factor, security and user experience issues have limited the usage of UEs for access control. Security may come at the expense of an improved user experience, and an improved user experience may come at the expense of better security. For instance, security reasons may necessitate that a user retrieves the UE (e.g., from a pocket, bag, etc.), performs a secure unlocking of the UE (e.g., biometric unlock, enter a password or identifier, draw a pattern, etc.), opens a specific application, and makes a selection, via the application, to signal intent to access a particular entry point, before the application verifies and authorizes the user's permissions to access the particular entry point with a remote system controlling access to the particular entry point. These numerous steps lead to a poor user experience and significant delay before the user gains access to the particular entry point. An improved user experience may provide access with fewer steps in less time at the expense of security. For instance, the UE may automatically authorize access to the particular entry point when in range of the particular entry point. However, a first user associated with the UE may have no intent to access the particular entry point, and a nearby unauthorized user may access the particular entry point instead.

DETAILED DESCRIPTION

Figure 1:
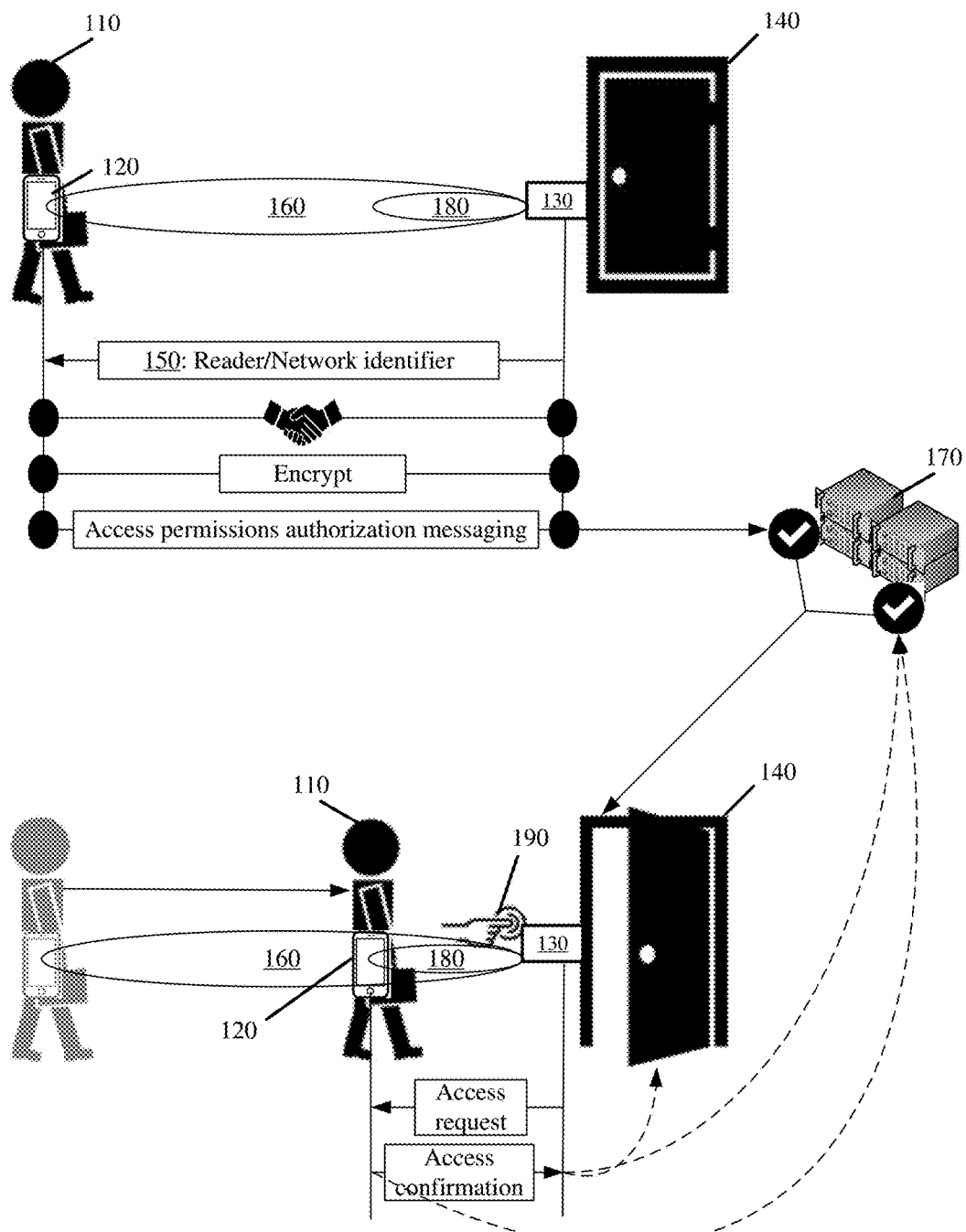
FIG. 1 conceptually illustrates the secure handsfree two-stage access control in accordance with some embodiments.

The following detailed description refers to the accompanying drawings. The same reference numbers in different drawings may identify the same or similar elements.

Systems and/or methods, as described herein, provide an access control reader for secure handsfree two-stage access control with mobile devices. The secure handsfree two-stage access control may include a first stage for establishing a secure connection with a User Equipment ("UE") (e.g., mobile device of a user), and authorizing access permissions of the UE or associated user to a secured resource over the secure connection when the UE is within a first distance from the reader. The secure handsfree two-stage access control may also include a second stage for securely validating the user's intent to access the secured resource when the UE is at a lesser second distance from and/or is the closest UE to the reader.

Successful completion of the first and second stages provides the user with access to the secured resource in a handsfree manner that does not require any user interaction with the UE. The user experience is further improved as a result of performing the lengthier access permissions authorization procedure from the greater first distance so that access appears to be granted instantaneously when the authorized user and UE enter within the second distance from the reader. Specifically, the second stage involves a much shorter access granting procedure, and significantly fewer messages than are used to establish the secure connection and authorize access during the first stage.

The improved user experience provided by the secure handsfree two-stage access control presented herein does not however compromise security. Completion of the first and second stages are secured by encrypting the communications between the UE and the reader. Additional security controls may include configurably setting the second distance to more accurately determine whether a user is simply passing by the reader or intends to access the secured resource, and/or to prevent unauthorized users from being able to access the secured resource before the authorized user.

The secure handsfree two-stage access control may be used to control and/or provide access to any physical or digital resource that can be locked and unlocked, closed and opened, or otherwise made inaccessible and accessible. For instance, the secure handsfree two-stage access control may be used to open entry, provide access, and/or operate a secured location (e.g., door, window, gate, lock, etc.), device (e.g., vehicle, system, computer, Internet-of-Things ("IoT") device, etc.), or other secured resource.

In some embodiments, the access permissions authorization procedure performed at the first stage of the secure handsfree two-stage access control may include establishing a secure connection between a UE and the reader, and authorizing access permissions of the UE based on the reader and the UE exchanging a first set of messages when the UE is within a configurable first distance from the reader. In some embodiments, the access granting procedure performed at the second stage of the secure handsfree two-stage access control may include providing access to a secured resource in response to the reader detecting a gesture or action that is performed by a user of the UE without involving the UE, determining that a UE authorized for accessing the secured resource is within a configurable different second distance from the reader, and/or exchanging an abbreviated second set of messages (e.g., an unlock message from the UE to the reader) to request and grant access to that secured resource.

FIG. 1 conceptually illustrates the secure handsfree two-stage access control in accordance with some embodiments. The figure illustrates user 110 with UE 120 at different distances from reader 130 and secured resource 140.

Reader 130 may operate via a particular wireless technology or network. For instance, reader 130 may operate via Bluetooth, Bluetooth Low Energy ("BLE"), or other short-range or long-range (e.g., WiFi) wireless technology. Reader 130 transmits message 150 over the particular wireless network with a range or within a service region that spans first distance 160. Message 150 may include an identifier associated with reader 130 and/or the particular wireless network that may be used by UE 120 to establish a connection with reader 130. First distance 160 may be controlled by varying the power that is allocated to an antenna of reader 130, and/or the power that is used to transmit message 150. For instance, a Bluetooth network created by reader 130 may have a range up to 100 meters when reader 130 is a class 1 Bluetooth device and reader 130 transmits at 100 milliwatts (mW).

When UE 120 is within first distance 160 from reader 130 (e.g., in range of the wireless network generated by reader 130), UE 120 may receive message 150. UE 120 may be configured, via an application running on UE 120, to establish a connection with reader 130, and/or to perform the access permissions authorization procedure in response to receiving message 150. For instance, UE 120 may exchange messaging with reader 130 in order to establish a secure Transport Layer Security ("TLS") connection with reader 130. Once the connection is established between UE 120 and reader 130, UE 120 may provide one or more access credentials, security tokens, and/or other identifying parameters for UE 120 or user 110 to reader 130. Reader 130 may determine, based on the provided parameters, whether UE 120 or associated user 110 is authorized to access secured resource 140. Reader 130 may authorize access locally using stored access permissions for different UEs or users, and the parameters obtained from UE 120. Alternatively, reader 130 may authorize access by providing the parameters obtained from UE 120 and/or an identifier for secured resource 140 over a different second connection to Access Control Unit ("ACU") 170. ACU 170 may notify reader 130 as to whether UE 120 or associated user 110 is authorized to access secured resource 140.

Access to secured resource 140 is not granted because the second stage of the secure handsfree two-stage access control still has to be completed. Nevertheless, the lengthy and time-consuming message exchanges of the first stage for establishing a secure or unsecure connection and authorizing access are complete.

Execution of the second stage may be triggered in response to reader 130 detecting gesture 190 or action made by user 110. Gesture 190 may include user 110 waving his/her hand, touching reader 130, and/or speaking an audible phrase. Other gestures or actions that do not involve a user interaction with UE 120 or other UE can also be used to trigger execution of the second stage. In some embodiments, reader 130 may be configured to detect gestures or actions within second distance 180 from reader 130, wherein second distance 180 is less than first distance 160. In some embodiments, second distance 180 may be configured to be less than three feet from reader 130. Gesture 190, involving a user touching reader 130, is one example of a gesture or action that can be detected when the user is within second distance 180.

In response to detecting gesture 190, reader 130 determines if an authorized UE is within second distance 180 from reader 130. If gesture 190 is detected, UE 120 was successfully authorized, and UE 120 is not within second distance 180, then access to secured resource 140 is denied for security reasons. In particular, user 110 may be too far away from secured resource 140 to ensure that another unauthorized user does not gain access to secured resource 140 based on the authorization of UE 120 or user 110. For the same reasons, access to secured resource 140 is denied if gesture 190 is detected, UE 120 was successfully authorized, and another unauthorized UE is detected to be within second distance 180. Access to secured resource 140 may also be denied if UE 120 was successfully authorized, UE 120 is within second distance 180 from reader 130, and no gesture is detected by reader 130. In this case, access is denied because user 110 has not indicated his/her intent to access secured resource 140 via a gesture or action, and may be simply walking in front of or by reader 130 to go somewhere else.

As shown in FIG. 1, reader 130 detects gesture 190 when UE 120 is within second distance 180 from reader 130. Reader 130 may determine that UE 120 is within second distance 180 using signal strength, Time-of-Flight ("ToF"), movement patterns, sound, other techniques, and/or measurements. Reader 130 also determines that UE 120 or user 110 has already been authorized for access to secured resource 140 as a result of the earlier successful completion of the first stage.

Based on determining that UE 120 is within second distance 180 and UE 120 or user 110 is authorized to access secured resource 140, reader 130 may identify the connection that was established between UE 120 and reader 130 during the first stage. Reader 130 may then send an access request message to UE 120, and UE 120 may provide an access confirmation message via the same wireless connection and wireless network. The access request message may contain a unique code that can be used to gain access to secured resource 140 for a short period of time. The access confirmation message may return the unique code. In response to receiving the access confirmation message from UE 120, reader 130 may provide access to secured resource 140.

Reader 130 may provide access by directly interfacing with and controlling secured resource 140. For instance, reader 130 may send signaling that opens or unlocks an electronic lock of secured resource 140. Reader 130 may also provide access to secured resource 140 via ACU 170. In this case, reader 130 may send a message to ACU 170 to provide access to secured resource 140, and ACU 170 may interface with and control secured resource 140.

Simultaneous or contemporaneous with sending the access confirmation message from UE 120 to reader 130, UE 120 may also send an access confirmation message to ACU 170 via a different wireless network (e.g., WiFi or Long- Term Evolution ("LTE")). The access confirmation message to ACU 170 may also include the unique code that was provided to UE 120 in the access request message. ACU 170 may identify secured resource 140 based on the unique code, and if the time period for the unique code has not expired, ACU 170 may interface with secured resource 140 to grant UE 120 access. UE 120 may send multiple access confirmation messages to the same or different destinations (e.g., reader 130, secured resource 140, and ACU 170) for performance and/or redundancy reasons.

In some embodiments, the access request and access confirmation messaging are not exchanged between reader 130 and UE 120. In some such embodiments, reader 130 may provide access to secured resource 140 immediately in response to detecting gesture 190, detecting UE 120 to be within second distance 180, and determining that UE 120 or user 110 associated with UE 120 was previously authorized for access to secured resource 140.

In any case, since the longer procedures and message exchanges for secure connection establishment and authorization were completed at the first stage when user 110 was within first distance 160 from reader 130, the second stage may be completed very quickly based on as little as two messages exchanged (e.g., over several milliseconds) between reader 130 and UE 120 and/or the time to provide access to secured resource 140. To user 110, it appears that access to secured resource 140 is granted almost instantaneously after user 110 performs gesture 190. Moreover, user 110 may gain access to secured resource 140 without any user interaction with UE 120 such that UE 120 may remain in the pocket, purse, or elsewhere on user 110, or while user 110 uses UE 120 for other purposes unrelated to access control (e.g., sending an email, browsing the web, etc.).

In the event that second distance 180 is large enough that reader 130 detects multiple UEs 120 within second distance 180 when the second stage is executed, reader 130 may use signal strength, ToF, and/or other measurements to determine which UE is closest to reader 130. Reader 130 may then determine if the closest UE is authorized to access secured resource 140 before providing or denying access. Distinguishing the closest UE from other UEs within second distance 180 provides added security in differentiating between UEs that merely pass before reader 130 from a UE and associated user that seeks access to secured resource 140. In some embodiments, second distance 180 may be set to reduce the likelihood of multiple UEs being within second distance 180. For instance, if second distance 180 is set to be one foot from reader 130, it is unlikely that multiple UEs are placed at that proximity to reader 130 at the same time.

Figure 2:
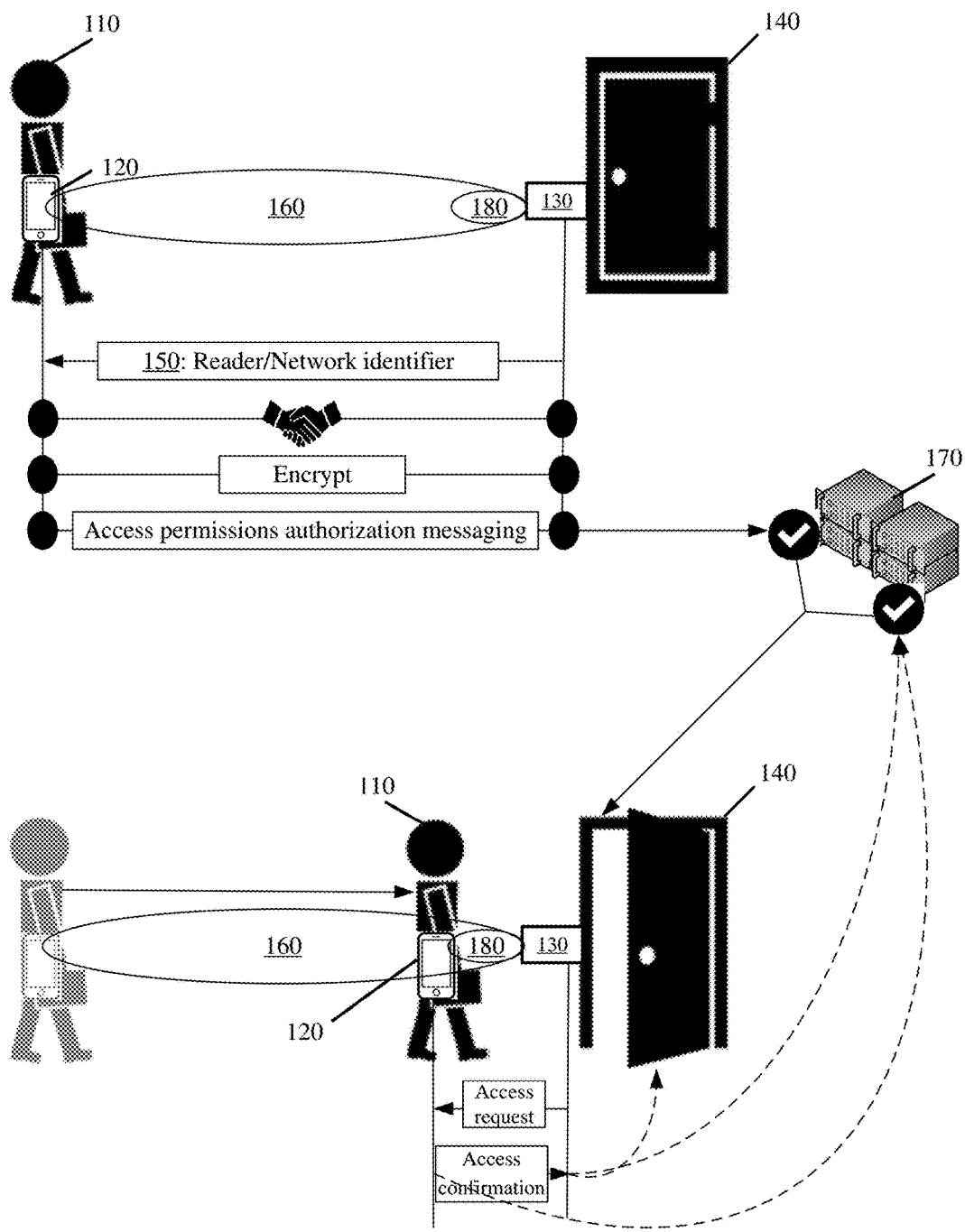
FIG. 2 conceptually illustrates the secure handsfree two-stage access control without a user gesture in accordance with some embodiments.

In some embodiments, the second stage may be triggered and completed without reader 130 detecting a user gesture (e.g., gesture 190) or action. FIG. 2 conceptually illustrates the secure handsfree two-stage access control without a user gesture in accordance with some embodiments.

As in FIG. 1, FIG. 2 illustrates UE 120 connecting to reader 130, and performing the access authorization procedure associated with the first stage of the two-stage access control when UE 120 is within first distance 160 of reader 130, and UE 120 receives message 150 from reader 130. Once again, no access is granted to secured resource 140, even when UE 120 or user 110 is successfully authorized for access to secured resource 140, until reader 130 detects UE 120 to be within second distance 180. Reader 130 may determine distance of UE 120 and other connected UEs based on signal strength, ToF, movement patterns, sound, other techniques, and/or measurements.

In response to reader 130 detecting UE 120 to be within second distance 180, without user 110 performing any gesture to trigger execution of the second stage, reader 130 may send the access request message to UE 120, and UE 120 may provide the access confirmation message. Reader 130 may then provide access to secured resource 140 in response to receiving the access confirmation message.

Since there is no gesture or other user-initiated action to trigger execution of the second stage, second distance 180 in FIG. 2 may be set to be less than second distance 180 in FIG. 1. For example, second distance 180 in FIG. 2 may be set to be a few inches from reader 130. Reader 130 may accurately determine user's 110 intent to access secured resource 140 when there is such a short distance between UE 120 and reader 130. This preserves the user experience as the access is still provided without any user 110 interaction with UE 120, such that UE 120 may remain in the pocket, purse, or elsewhere on user 110, or while user 110 uses UE 120 for other purposes unrelated to access control (e.g., sending an email, browsing the web, etc.). Security is also not compromised because the short distance of a few inches between reader 130 and UE 120 prevents unauthorized users from gaining access to secured resource 140 without knowledge of user 110 (e.g., as user 110 is only a few inches from secured resource 140).

Figure 3:
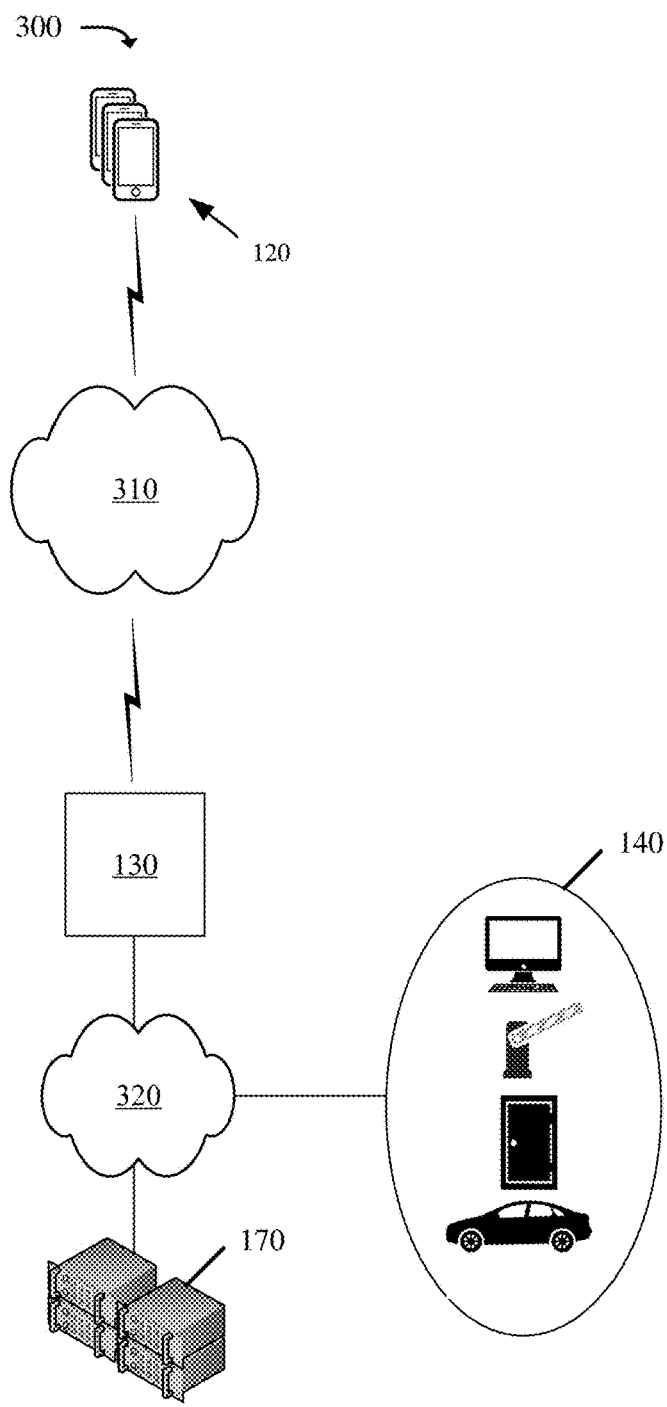
FIG. 3 illustrates example system for the secure handsfree two-stage access control in accordance with some embodiments.

FIG. 3 illustrates example system 300 for the secure handsfree two-stage access control in accordance with some embodiments. System 300 includes one or more UEs 120, one or more readers 130, secured resource 140, ACU 170, wireless first network 310, and second network 320.

UEs 120 may include any mobile device with at least one wireless radio for wireless communication over wireless first network 310. For instance, UEs 120 may include one or more Near Field Communication ("NFC"), Bluetooth, WiFi, LTE, or Next Generation ("5G") radios. In some implementations, UE 120 may be or may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, an IoT device, a wearable device, and/or other mobile device that can be carried on one's person.

In some embodiments, UE 120 may run an application that performs the UE-side of the secure handsfree two-stage access control. Specifically, the application may establish a connection with reader 130 when UE 120, on which the application executes, comes within first distance 160 from reader 130. The application may provide security and/or other identifying parameters to reader 130 for authorization at the first stage, and also messaging to complete the second stage and request access to secured resource 140. The application may be provided by the access control administrator, or by an entity that uses the secure handsfree two-stage access control to provide access to secured resource 140.

Reader 130 may provide a wireless interface by which UE 120s may request and gain access to secured resource 140. For instance, reader 130 may wirelessly communicate with UEs 120, and may perform the secure handsfree two-stage access control described above in order to provide access to a particular secured resource 140 associated with reader 130. Reader 130 may also provide alternative interfaces for accessing secured resource 140. For instance, reader 130 may include a transducer, magnetic field generator, and/or excitation circuit to communicate with proximity cards or smart cards that operate in the 125 kilohertz and 13.56 megahertz frequencies respectively.

Each reader 130 may be located adjacent to or on a secured resource 140, and may wirelessly communicate with UEs 120 over wireless first network 310. Examples of wireless first network 310 and/or wireless technologies used for communications over first network 310 include NFC, Bluetooth, BLE, WiFi, LTE, and/or other networking technologies. Reader 130 may have one or more antennae to support wireless communication with different devices using these and other wireless networking technologies. Reader 130 may also include two or more of the same antennae to accurately determine the location of UE 120. For instance, reader 130 may use two or more directional antennae to determine if a UE 120 is operating from insides a building, in which case access is not needed, or is operating outside the building, in which case access may be provided if authorized.

Reader 130 may also include memory or storage for tracking authorization status of different connected UEs 120 so that once the second stage is executed, reader 130 may immediately determine if a particular UE 120 that is within second distance 180 from reader 130 should be provided access. The memory or storage may also store access permissions associated with UEs 120. In particular, the memory or storage may store identifiers or access credentials of authorized UEs or users, and/or a time or schedule that each UE or user is provided access. For instance, reader 130 may be configured to authorize access for a first set of UEs 120 during regular business hours, while authorizing access for a different second set of UEs 120 outside regular business hours.

Second network 320 may provide wired or wireless connectivity between reader 130, ACU 170, and/or secured resource 140. For instance, reader 130 may use second network 320 to directly interface with and to directly control access to secured resource 140. Reader 130 may provide signaling to secured resource 140 via second network 320 that causes secured resource 140 to open or provide access.

Secured resource 140 may include any physical or digital asset that can be locked and unlocked, closed and opened, or otherwise made inaccessible and accessible. In some embodiments, secured resource 140 may be a door, window, gate, or other physical barrier with a controllable locking or closing mechanism. In some embodiments, secured resource 140 may be a computer, vehicle, or other system with restricted access.

ACU 170 may be a management device that interfaces with reader 130 and/or secured resource 140 using second network 320 for configuration, authorization, access, and/or other purposes. An administrator may access ACU 170 to configure the first and second distances for reader 130. ACU 170 may configure different distances for different readers 130. For instance, the second distance for a first reader used to access a building door may be set to three feet, whereas the second distance for a second reader used to access a turnstile may be set to a few inches to ensure that an authorized user and/or UE enters the turnstile before access is granted to proceed through the turnstile.

ACU 170 may also authorize access on behalf of readers 130. When UE 120 connects to reader 130, UE 120 may provide various identifying or authorization information to reader 130. Reader 130 may forward the identifying or authorization information to ACU 170 using second network 320, and ACU 170 may authorize or deny UE 120 access to secured resource 140. In some embodiments, ACU 170 may provide the authorization result to reader 130. In some other embodiments, ACU 170 may store the authorization result and may use the authorization result to provide UE 120 access to secured resource 140 once UE 120 completes the second stage.

When performing the second stage of the secure handsfree two-stage control access, UE 120 may transmit a first access confirmation message to reader 130 via wireless first network 310, and may also transmit a second access confirmation message to ACU 170 via a different network (e.g., WiFi or LTE). The requests may be sent simultaneously or contemporaneously for redundancy and/or performance reasons (e.g., obtain access based on whichever of reader 130 or ACU 170 is first to act on the message, or whichever message is first to arrive at ACU 170 when reader 130 forwards the messages to ACU 170). Reader 130 may forward the first access confirmation message via second network 320 to ACU 170, and ACU 170 may signal reader 130 to grant access to secured resource 140, or may directly interface with secured resource 140 in order to provide access.

As noted above, in some embodiments, the second stage of the secure handsfree two-stage access control may be triggered based on reader 130 detecting at least one user gesture or action, and may complete based on reader 130 detecting an authorized UE 120 to be second distance 180 from reader 130. Reader 130 may have one or more sensors to detect the at least one user gesture.

The gesture can be any physical movement or sound. For instance, reader 130 may include a touch sensor (e.g., capacitive, resistive, or pressure) that detects a user touch. In some embodiments, reader 130 may have a physical button that can be pressed to initiate the second stage. The touch-based gestures are effective in controlling the distance at which the second stage may be triggered, and also preventing user 110 from triggering the second stage when associated UE 120 is not within second distance 180. Reader 130 may include a microphone to record spoken phrases some distance from reader 130. Reader 130 may include a camera or infrared motion sensor to detect a user gesture some distance from reader 130. For instance, the camera field-of-depth can be adjusted to detect gestures within different distances from reader 130.

Reader 130 may include one or more sensors to detect UE 120 entering within second distance 180 from reader 130. For instance, reader 130 may include a speaker that emits an ultrasonic sound that is imperceptible by humans, but that can be detected by a microphone of UE 120 when UE 120 is within the configurable second distance from reader 130. When the ultrasonic sound is detected using the microphone of UE 120, UE 120 may signal reader 130 to trigger the second stage. By controlling the frequency and/or attenuation of the ultrasonic sound, reader 130 may be able to configure the distance at which the sound may be detected by a microphone of UE 120. Alternatively, UE 120 can emit the ultrasonic sound, and reader 130 may include a microphone to detect the ultrasonic sound, and to trigger the second stage.

In some embodiments, reader 130 may use a first network radio to communicate via wireless first network 310, and a different second network radio to detect UEs 120 that are within second distance 180 from reader 130. For instance, reader 130 may include a Bluetooth radio for communicating via first network 320, and may include an NFC radio for detecting UEs 120 when they are within second distance 180 from reader 130. NFC is a very short-range wireless technology that may be used to accurately and wirelessly detect devices that are a few inches from reader 130.

In preferred embodiments, reader 130 may monitor ToF, signal strength, and/or other signaling to determine UE 120 distances from reader 130. By measuring UE 120 signaling, reader 130 may accurately identify which UE 120 is closest to reader 130, and/or if an authorized UE 120 is within second distance 180 from reader 130.

Figure 4:
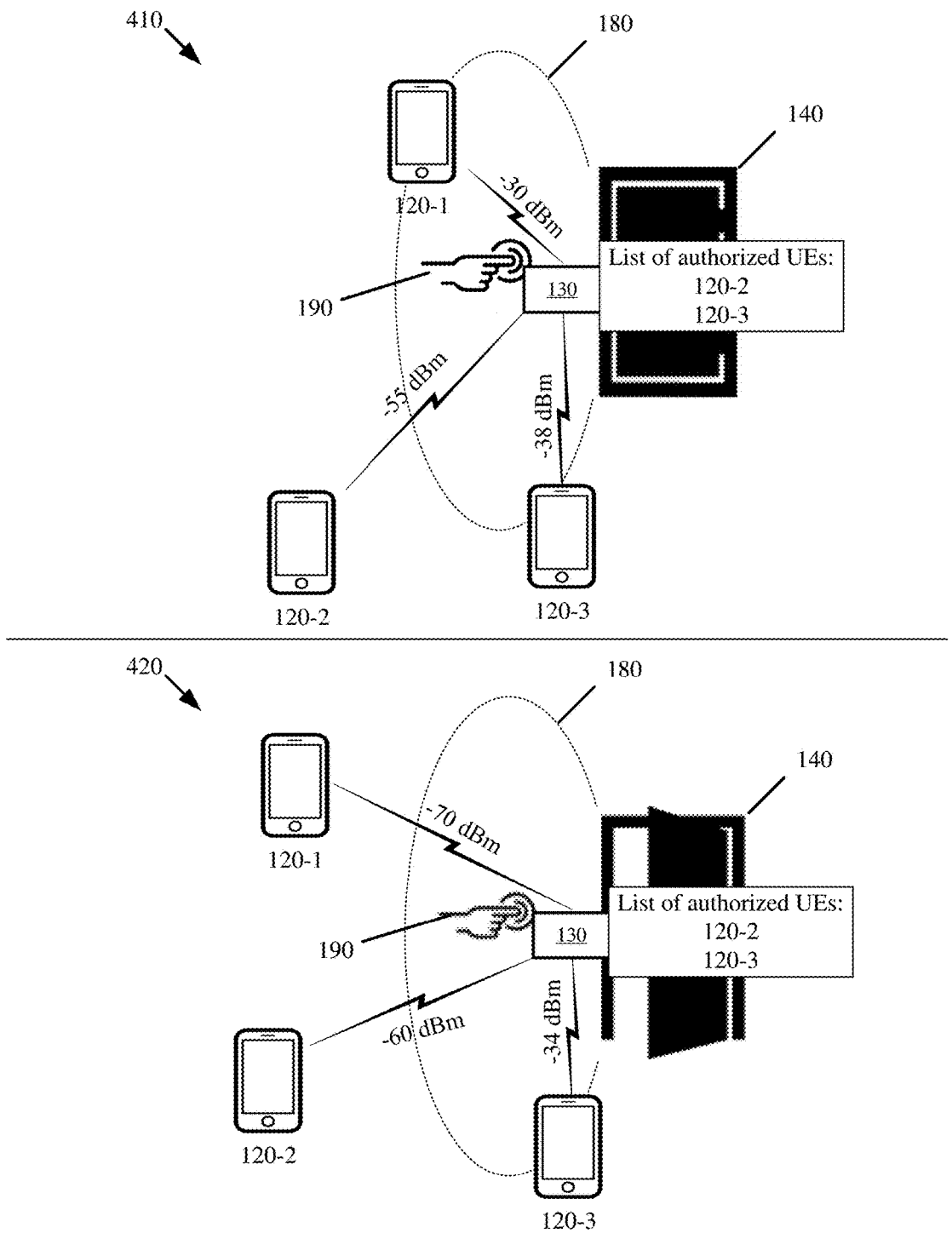
FIG. 4 conceptually illustrates executing the second stage of the secure handsfree two-stage access control based on the reader monitoring UE signal strengths in accordance with some embodiments.

FIG. 4 conceptually illustrates executing the second stage of the secure handsfree two-stage access control based on reader 130 monitoring UE 120 signal strengths in accordance with some embodiments. FIG. 4 illustrates first scenario 410 and second scenario 420 showing different locations for unauthorized UE 120-1 and authorized UEs 120-2 and 120-3.

In some embodiments, reader 130 may continuously or periodically monitor the signal strength of each UE 120-1, 120-2, and 120-3 that is within first distance 160 from reader 130, and/or that establishes a network connection with reader 130. For instance, reader 130 may monitor the signal strength of any UE that is within range of a wireless network (e.g., Bluetooth) that is created by reader 130.

In first scenario 410, reader 130 may detect gesture 190 that triggers execution of the second stage. Reader 130 may obtain measurements for the signal strength of each UE 120-1, 120-2, and 120-3. Reader 130 determines that UE 120-1 and UE 120-3 are within second distance 180 from reader 130. The determination may be made by mapping the measured signal strengths to different distances. Reader 130 may also determine that unauthorized UE 120-1 (e.g., a UE that did not successfully complete the first stage, or that does not have permission to access secured resource 140) is closest to reader 130. Reader 130 may store, in local memory, a list of identifiers for UEs that have successfully completed the first stage, and are authorized to access secured resource 140. Each identifier uniquely identifies a particular UE. The identifier may include one or more of an address, port number, and/or session identifier used in communicating with the particular UE over an established network connection between reader 130 and that particular UE. The identifier can also be a telephone number, an international mobile subscriber identity ("IMSI"), or other value that is unique to the UE, and that reader 130 may obtain during execution of the first stage. Accordingly, in first scenario 410, the second stage cannot complete and access to secured resource 140 is not provided to prevent unauthorized access by the user associated with UE 120-1 that is closest to secured resource 140.

In second scenario 420, reader 130 may again detect gesture 190 that triggers execution of the second stage. Reader 130 may obtain new measurements for the signal strength of each UE 120-1, 120-2, and 120-3. Based on the measured signal strengths, reader 130 may determine that only UE 120-3 is within second distance 180 from reader 130. Reader 130 may perform a lookup to local memory, or via ACU 170, to determine that UE 120-3 has successfully completed the first stage and is authorized to access secured resource 140. Accordingly, reader 130 may provide UE 120-3 access to secured resource 140.

In some embodiments, reader 130 directly interfaces with secured resource 140 via second network 320 to provide UE 120-3 with access. In some other embodiments, reader 130 submits a request to ACU 170 via second network 120, and ACU 170 directly interfaces with secured resource 140 to grant access.

In some embodiments, reader 130 provides access after sending the access request message to UE 120-3, and the access confirmation message arriving at reader 130 and/or ACU 170. UE 120-3 may send the access confirmation message to reader 130 over first network 310 using the connection that was previously established with UE 120-3 during execution of the first stage, and may send the access confirmation message to ACU 170 over a different wireless third network. Once again, the multiple access confirmation messages may be sent for redundancy and performance reasons. For instance, during a first time, ACU 170 may receive the access confirmation message directly from UE 120-3 over the third network, before receiving the access confirmation message that is forwarded by reader 130 to ACU 170 over second network 320. However, during a second time in which there is more congestion on the third network, ACU 170 may receive the access confirmation message forwarded by reader 130 over second network 320, before receiving the message sent directly from UE 120-3 over the third network. In some other embodiments, reader 130 provides access immediately upon detecting UE 120-3 to be within second distance 180 from reader 130, and determining that UE 120-3 is authorized to access secured resource 140 without exchanging the access request and access confirmation messaging.

The signal strength-to-distance correlation may be different for different UEs 120. For instance, first UE 120-1 and second UE 120-2 may be an equal distance from reader 130. However, first UE 120-1 may provide more power to its antenna than second UE 120-2. Reader 130 may detect the signal strength of first UE 120-1 to be greater than second UE 120-2, and may therefore incorrectly determine that first UE 120-1 is closer than second UE 120-2. To account for these and other variations in signal strength, reader 130 may perform machine learning or may be programmed with different signal strength-to-distance correlations for different UEs 120 or UEs 120 of different types.

In some embodiments, reader 130 may perform a time series tracking of signal strength to improve the accuracy of the distance monitoring. The time series tracking may include reader 130 retaining one or more past measurements of signal strength for each UE 120. From the past measurements, reader 130 may determine whether UE 120 is approaching or moving away from reader 130. For instance, if the signal strength of UE 120 increases from a past measurement, then reader 130 may determine that UE 120 is approaching reader 130. Reader 130 may also track the rate at which the signal strength changes to determine if UE 120 is moving straight towards reader 130 or if UE 120 is moving tangentially to or around reader 130. Reader 130 may not initiate the second stage and may restrict access to secured resource 140 when UE 120 is within second distance 180 from reader 130, UE 120 is authorized to access secured resource 140, but UE 120 is determined to be moving away from, tangentially to, or around reader 130 based on the time series tracking of the signal strength for that UE 120. Reader 130 may also use multiple antennae to triangulate the position and/or direction of movement for different UEs 120.

Figure 5:
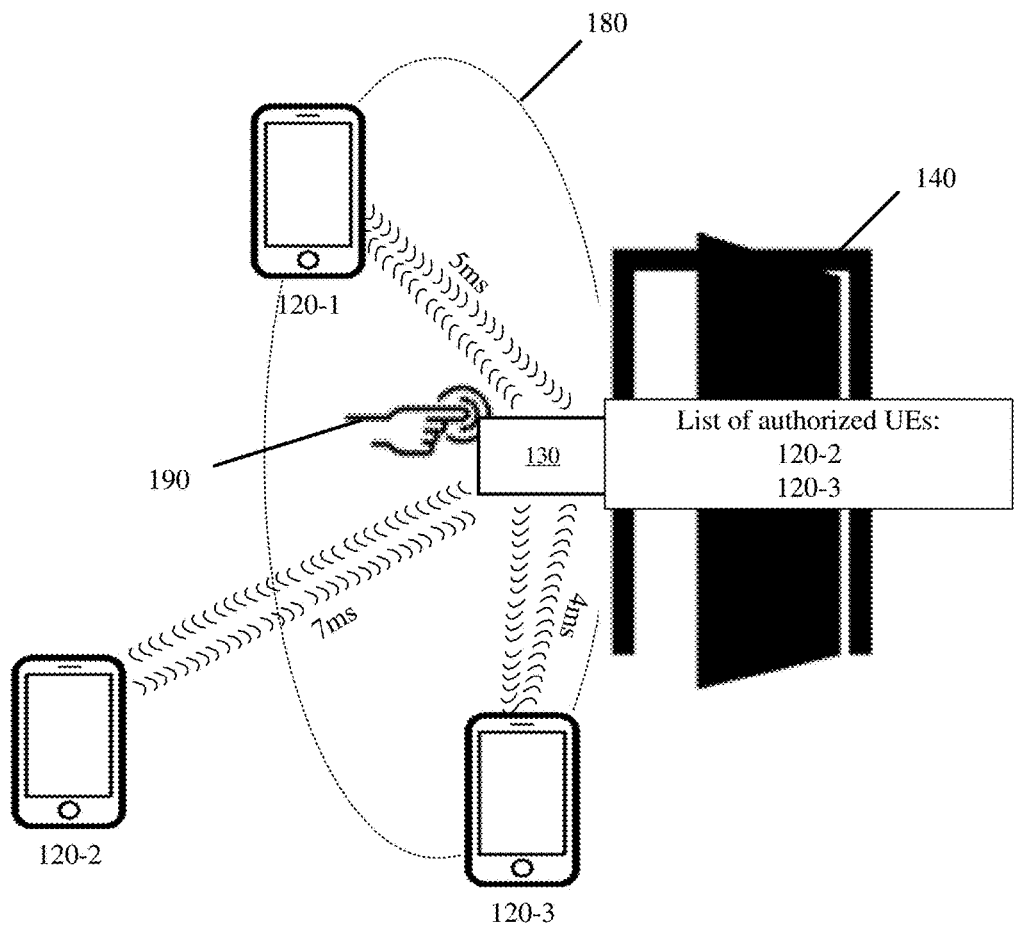
FIG. 5 conceptually illustrates executing the second stage of the secure handsfree two-stage access control based on the reader monitoring UE time-of-flight in accordance with some embodiments.

ToF is alternative measurement that reader 130 may use to determine UE distance from reader 130. FIG. 5 conceptually illustrates executing the second stage of the secure handsfree two-stage access control based on reader 130 monitoring UE ToF in accordance with some embodiments.

As shown in FIG. 5, reader 130 derives a ToF measurement for each UE 120-1, 120-2, and 120-3. In some embodiments, reader 130 measures the ToF by sending and receiving data packets (e.g., 802.11v messaging), or by emitting light, sound, radio frequencies, or other signaling to each UE 120-1, 120-2, and 120-3, and measuring the time for each UE 120-1, 120-2, and 120-3 to reply or relay back the signaling. For instance, reader 130 may address a first packet to UE 120-1, send the first packet with a first timestamp to UE 120-1, obtain a second timestamp for a second packet returned by UE 120-1, and derive the ToF measurement from the difference between the first and second timestamps.

Reader 130 may periodically measure ToF to each UE 120-1, 120-2, and 120-3, or may do so in response to detecting a gesture 190 for triggering the second stage. Reader 130 may map the ToF measurements to distance measurements, or may simply determine if the ToF measurements are within a threshold associated with being no greater than second distance 180 from reader 130.

Using the distance measurements derived from the ToF measurements, reader 130 may determine that unauthorized UE 120-1 and authorized UE 120-3 are within second distance 180 from reader 130, and that UE 120-3 is closest to reader 130. Since UE 120-3 is authorized to access secured resource 140 and is closest to secured resource 140, reader 130, independent of or in conjunction with ACU 170, may provide UE 120-3 access to secured resource 140.

ToF may be used instead of or in conjunction with signal strength or other distance measures of UEs 120 for accuracy and/or security reasons. With regards to security, ToF is also effective in preventing relay attacks. For instance, when relying solely on signal strength, unauthorized UE 120-1 may be brought within range of reader 130. Unauthorized UE 120-1 may proxy messaging from reader 130 to a remote device, and the remote device may authorize access to secured resource 140 via messaging it passes through unauthorized UE 120-1 to reader 130. When using ToF, reader 130 may detect that the round-trip-time of messages exchanged with unauthorized UE 120-1 exceed a threshold that is indicative of UE 120-1 relaying messaging to a remote device. Accordingly, reader 130 may detect the relay attack from the ToF measurements, and may prevent unauthorized UE 120-1 from gaining access to secured resource 140 even if the relayed messaging successfully authorizes UE 120-1 for access.

Figure 6:
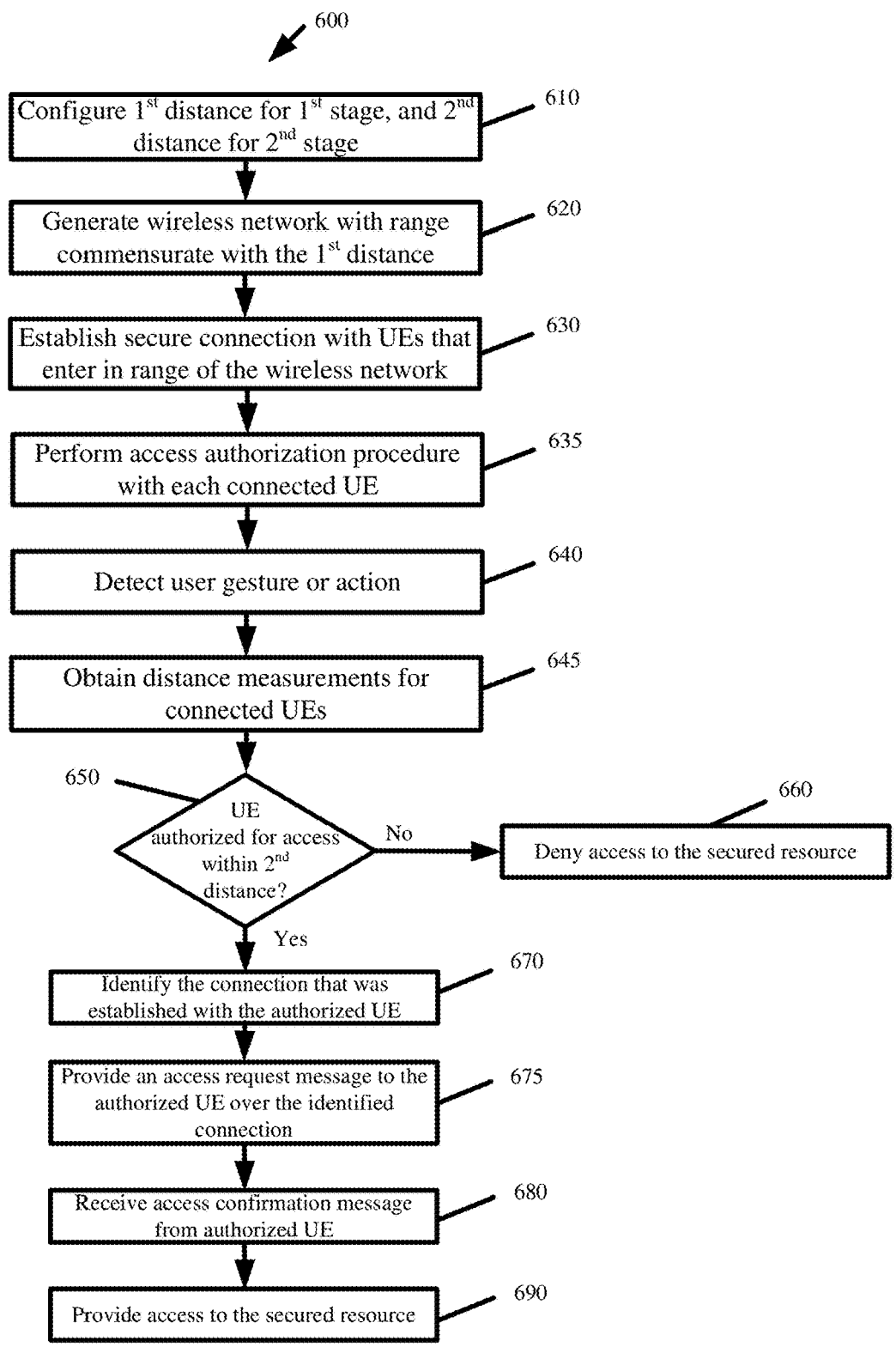
FIG. 6 presents a process for executing the secure handsfree two-stage access control from the reader in accordance with some embodiments.

FIG. 6 presents a process 600 for executing the secure handsfree two-stage access control from reader 130 in accordance with some embodiments. Process 600 may commence by configuring (at 610) reader 130 with a configurable first distance at which to perform the first stage, and a different configurable second distance at which to perform the second stage of the two-stage access control. An administrator may use an application or website to access and configure the first and second distances for reader 130. In some embodiments, configuration of reader 130 and/or other readers 130 under control of ACU 170 may be conducted through ACU 170. For instance, an administrator may log in to ACU 170, select a particular reader 130, configure the first and second distances for the particular reader 130, and ACU 170 may provide the values configured for the first and second distances to the particular reader 130 via second network 320.

Process 600 may include reader 130 generating (at 620) first wireless network 310 having a range commensurate with the configurable first distance. Reader 130 may adjust the amount of power provided to an antenna of reader 130, or the amount of power used to radiate first wireless network 310 in order to align the range of first wireless network 310 with the configured first distance. Generating (at 620) first wireless network 310 may include advertising an identifier that UEs 120 devices in range of first wireless network 310 may detect and use to connect to reader 130. The identifier may identify reader 130, and/or identify that reader 130 performs the secure handsfree two-stage access control or is part of a system that controls access to secured resource 140.

Process 600 may include reader 130 establishing (at 630) a secure connection (e.g., a TLS connection) with one or more UEs 120 that enter in range of first wireless network 310. Each UE 120 may execute an application that automatically establishes the secure connection with reader 130 upon receiving an identifier identifying reader 130 or other readers.

Reader 130 may then initiate the first stage, and may determine which UEs 120 are authorized to access secured resource 140 by performing (at 635) an authentication procedure with each of the one or more connected UEs 120. For instance, reader 130 may request and/or obtain access credentials, login parameters, security tokens, and/or other security or identifying parameters from each UE 120. Reader 130 may determine access privileges of each UE 120 to secured resource 140 by querying ACU 170 or a local repository with the obtained security or identifying parameters. The access privileges identify whether UE 120 is authorized to access secured resource 140.

Process 600 may include reader 130 detecting (at 640) a user gesture or action for triggering the second stage. For instance, reader 130 may use one or more sensors (e.g., camera, microphone, touch sensor, infrared light, etc.) to detect the user gesture with the user gesture or action not involving any user interactions with UE 120.

Process 600 may include obtaining (at 645) a distance measurement for each connected UE 120. Once again, reader 130 may use signal strength, ToF, or other signaling and/or various sensors to determine the distance of each UE 120. In some embodiments, reader 130 may trigger the second stage without detecting the user gesture or action, thereby skipping operation 640, in response to obtaining (at 645) the distance measurements, and detecting a UE 120 to be within the configurable second distance from reader 130.

Process 600 may determine (at 650) if a UE that has been authorized to access secured resource 140 is within the configurable second distance and/or is closest to reader 130. The determination may be based on the obtained (at 645) distance measurements for UEs 120.

In response to determining (at 650—No) that there are no authorized UEs within the configured second distance from reader 130 or that an unauthorized UE is closest to reader 130, process 600 may deny (at 660) or prevent access to secured resource 140. When secured resource 140 is already in a locked state, reader 130 takes no action.

In response to determining (at 650—Yes) that an authorized UE is within the configured second distance from reader 130 and/or is closest to reader 130, process 600 may initiate the second stage by identifying (at 670) the connection that was established with that authorized UE. Reader 130 may retain the secure connection that is established with each UE 120 so long as the UE 120 stays within range of the first wireless network (e.g., within the configured first distance from reader 130) generated (at 620) by reader 130. By retaining the established connections, and by reusing an existing established connection, reader 130 may execute the second stage without the lengthy and time-consuming process of establishing a connection. Reader 130 may instead communicate directly with the authorized UE that is determined to be within the configured second distance from reader 130 and/or is closest to reader 130. Specifically, process 600 may include providing (at 675) the access request message to the authorized UE over the existing connection with that authorized UE. Process 600 may include receiving (at 680) the access confirmation message from the authorized UE, and providing (at 690) access to secured resource 140 in response to the access confirmation message. Reader 130 may provide (at 690) access by forwarding the access confirmation message to ACU 170, and ACU 170 directly interfacing with secured resource 140 in order to provide the authorized UE with access. Alternatively, reader 130 may directly interface with secured resource 140 by providing signaling that causes secure resource 140 to grant access.

In some embodiments, reader 130 may forego providing (at 675) the access request message to the authorized UE, and instead, may proceed to provide (at 690) access to secured resource 140 in response to determining (at 650—Yes) that an authorized UE is within the configured second distance from reader 130 and/or is closest to reader 130.

Figure 7:
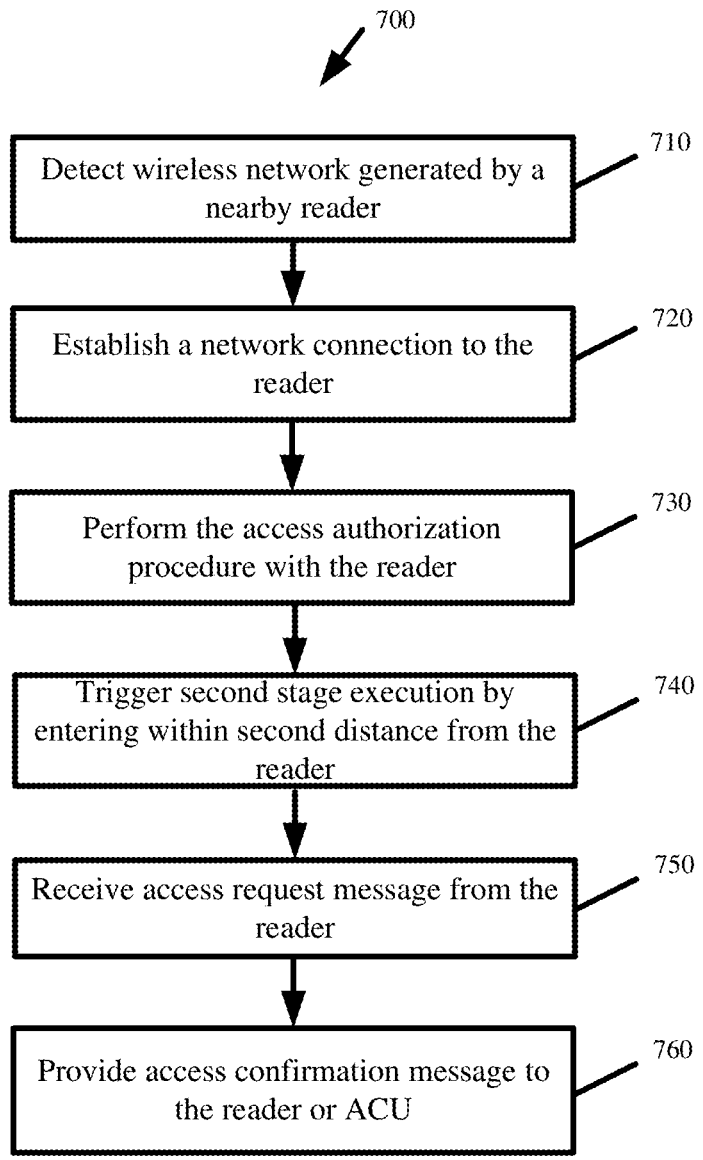
FIG. 7 presents a process for executing the secure handsfree two-stage access control from a UE in accordance with some embodiments.

FIG. 7 presents a process 700 for executing the secure handsfree two-stage access control from UE 120 in accordance with some embodiments. Specifically, one or more of the operations from process 700 may be executed by an access control application that runs on UE 120. The access control application may include the logic for communicating with reader 130 and other components (e.g., ACU 170) of an access control system that operate using the secure handsfree two-stage access control.

Process 700 may include detecting (at 710) first wireless network 310 that is generated by reader 130 upon UE 120 being moved within range of first wireless network 310 (e.g., the configured first distance from reader 130). For instance, UE 120 may receive the identifier that is advertised by reader 130 over first wireless network 310. The application may be configured with a list of reader identifiers. If the application receives an identifier that matches an identifier from the list of reader identifiers, the application may perform the first stage with reader 130.

Performing the first stage may include automatically establishing (at 720) a secure network connection to reader 130 via first wireless network 310. UE 120 and reader 130 may engage in a connection handshake procedure to negotiate security and/or encryption parameters for the secure network connection. After establishing the secure network connection, communications between the particular UE 120 and reader 130 may be encrypted.

Performing the first stage may further include performing (at 730) the access authorization procedure with reader 130. For instance, UE 120 may provide access credentials, a security token, a unique identifier, security parameters, identifying parameters, and/or other data with which reader 130 and/or ACU 170 may determine if UE 120 is authorized to access secured resource 140.

The connection established between UE 120 and reader 130 may be retained so long as UE 120 is within the first distance from reader 130. UE 120 may trigger (at 740) execution of the second stage when UE 120 is brought within the closer second distance from reader 130, and/or a user gesture is detected by reader 130. In response to triggering execution of the second stage and UE 120 having been authorized to access secured resource 140, process 700 may include receiving (at 750) an access request message from reader 130 via the established secure connection. The access request message may provide a unique code that UE 120 may use for a short period of time to gain access to secured resource 140. Accordingly, to gain access, process 700 may include providing (at 760) a first access confirmation message over first wireless network 310 to reader 130 and/or a second access confirmation message over one or more other wireless networks to ACU 170. For instance, UE 120 may provide the first access confirmation message to reader 130 via Bluetooth, and may simultaneously or contemporaneously provide the second access request message to ACU 170 via WiFi and/or an LTE network. In some embodiments, UE 120 or the access control application running thereon may be configured with the Internet Protocol ("IP") address, domain name, Uniform Resource Locator ("URL") or other identifier for communicating with ACU 170 via the one or more wireless networks. The access confirmation message may include the unique code provided with the access request message. Reader 130 and/or ACU 170 may send signaling that provides or grants access to secured resource 140 in response to receiving the access confirmation message with the unique code from UE 120.

Figure 8:
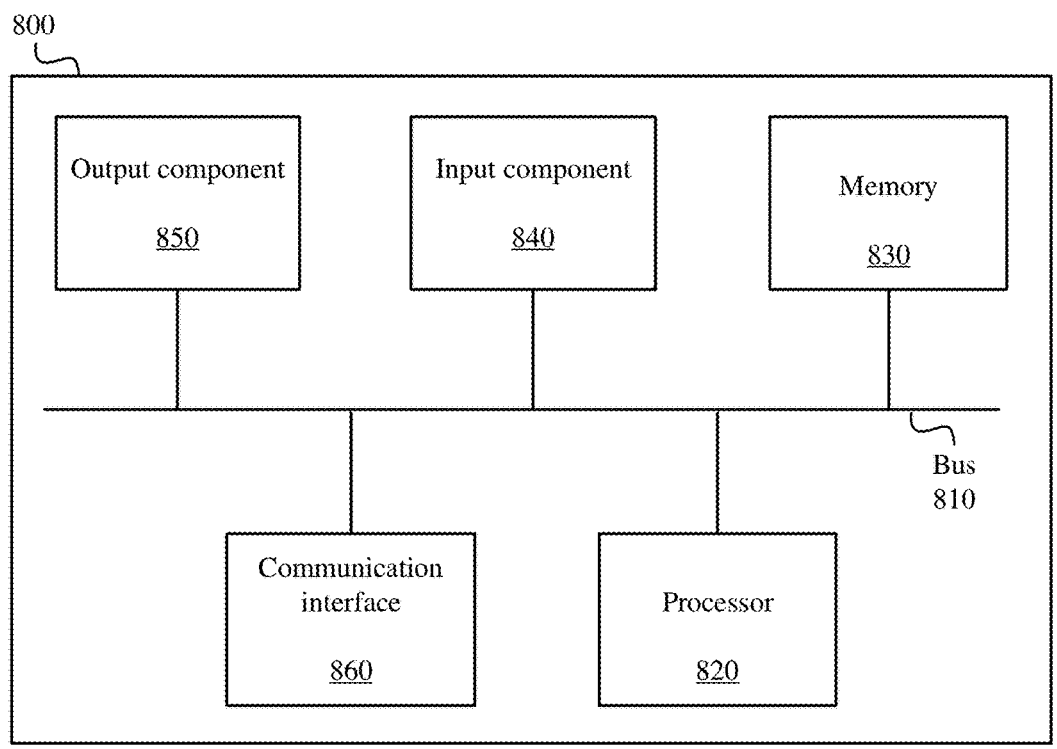
FIG. 8 illustrates example components of one or more devices, according to one or more embodiments described herein.

FIG. 8 is a diagram of example components of device 800. Device 800 may be used to implement certain of the devices described above (e.g., UE 120, reader 130, and ACU 170). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A device comprising:
   a wireless radio;
   a non-transitory computer-readable medium storing a set of processor-executable instructions; and
   one or more processors configured to execute the set of processor-executable instructions, wherein executing the set of processor-executable instructions causes the one or more processors to:
      advertise an identifier a first distance corresponding to a coverage area of a wireless network generated by the wireless radio;
      perform a first stage of a two-stage access control procedure based on a User Equipment ("UE") entering within the first distance, wherein performing the first stage comprises processor-executable instructions to:
         establish a connection with the UE via the wireless network based on a first set of messages exchanged between the UE and the device at a first time;
         authorize the UE for access to a secured resource based on a second set of messages exchanged between the UE and the device over the connection at the first time while the UE is within the first distance from the device and outside a second distance from the device, wherein the second distance is less than the first distance;
         maintain a plurality of connections with a plurality of UEs that are within the first distance from the device, wherein the plurality of connections comprises the connection established between the device and the UE;
      perform a second stage of the two-stage access control procedure at a subsequent second time based on the UE entering within the second distance from the device, wherein performing the second stage comprises processor-executable instructions to:
         detect, at the second time, distances between the device and the plurality of UEs;
         select the connection that was previously established with the UE from the plurality of connections in response to detecting the distance of the UE to be within the second distance from the device at the second time;
         provide an access request message to the UE at the second time using the connection that was previously established between the UE and the device in response to determining that the UE is authorized to access the secured resource as a result of the authorizing at the first time, and wherein the access request message comprises a unique code that grants access to the secured resource for a period of time;
         provide access to the secured resource based on a response to the access request message provided by the UE over the connection, the response comprising the unique code.

2. The device of claim 1 further comprising a sensor, and wherein the set of processor-executable instructions further include processor-executable instructions to initiate performing the second stage in response to detecting a user gesture with said sensor.

3. The device of claim 2, wherein the sensor is a touch sensor, and the user gesture is a physical touch of the device detected by the touch sensor.

4. The device of claim 2, wherein the sensor is a motion sensor detecting motion at least the second distance from the device, and the user gesture is a physical movement.

5. The device of claim 1, wherein the set of processor-executable instructions further include processor-executable instructions to obtain a distance measurement for each UE of the plurality of UEs.

6. The device of claim 5, wherein obtaining the distance measurement comprises a set of processor-executable instructions to monitor signal strength of each UE of the plurality of UEs.

7. The device of claim 5, wherein obtaining the distance measurement comprises a set of processor-executable instructions to monitor Time-of-Flight ("ToF") associated with each UE of the plurality of UEs.

8. The device of claim 1, wherein performing the second stage further comprises processor-executable instructions to:
- detect a first UE, that is authorized to access the secured resource, and a second UE, that is not authorized to access the secured resource, to be within the second distance from the device;
- provide access to the secured resource based on signal measurements obtained from the first UE and the second UE identifying the first UE as being closer to the device than the second UE;
- deny access to the secured resource based on the signal measurements identifying the second UE as being closer to the device than the first UE.

9. The device of claim 1, wherein providing access to the secured resource comprises processor-executable instructions to provide a message over a different second connection, established via a second network, to an Access Control Unit ("ACU") controlling access to the secured resource, wherein the ACU unlocks access to the secured resource on behalf of the device based on the response to the message.

10. The device of claim 1, wherein providing access to the secured resource comprises processor-executable instructions to interface with the secured resource and provide signaling that causes the secured resource to provide access.

11. The device of claim 1, wherein the set of processor-executable instructions further include processor-executable instructions to configure the first distance and the second distance for the device.

12. The device of claim 11, wherein the set of processor-executable instructions further include processor-executable instructions to adjust an amount of power allocated to the wireless radio based on said configuring of the first distance.

13. The device of claim 11, wherein the first distance is greater than five feet from the device, and the second distance is less than three feet from the device.

14. A method comprising:
- advertising an identifier a first distance from a device, the first distance corresponding to a coverage area of a wireless network;
- performing a first stage of a two-stage access control procedure based on a User Equipment ("UE") entering within the first distance, wherein performing the first stage comprises:
  - establishing a connection with the UE via the wireless network based on a first set of messages exchanged between the UE and the device at a first time;
  - authorizing the UE for access to a secured resource based on a second set of messages exchanged between the UE and the device over the connection at the first time while the UE is within the first distance from the device and outside a second distance from the device, wherein the second distance is less than the first distance; and
  - maintaining a plurality of connections with a plurality of UEs that are within the first distance from the device, wherein the plurality of connections comprises the connection established between the device and the UE;
- performing a second stage of the two-stage access control procedure at a subsequent second time based on the UE entering within the second distance from the device, wherein performing the second stage comprises:
  - detecting, at the second time, distances between the device and the plurality of UEs;
  - selecting the connection that was previously established with the UE from the plurality of connections in response to detecting the distance of the UE to be within the second distance from the device at the second time;
  - providing an access request message to the UE at the second time using the connection that was previously established between the UE and the device in response to determining that the UE is authorized to access the secured resource as a result of the authorizing at the first time, and wherein the access request message comprises a unique code that grants access to the secured resource for a period of time; and
  - providing access to the secured resource based on a response to the access request message provided by the UE over the connection, the response comprising the unique code.

* * * * *